Aug. 4, 1925.
C. H. WIDMAN
AUTOMOBILE BODY MANUFACTURE
Filed Oct. 26, 1923 — 4 Sheets-Sheet 1
1,548,798
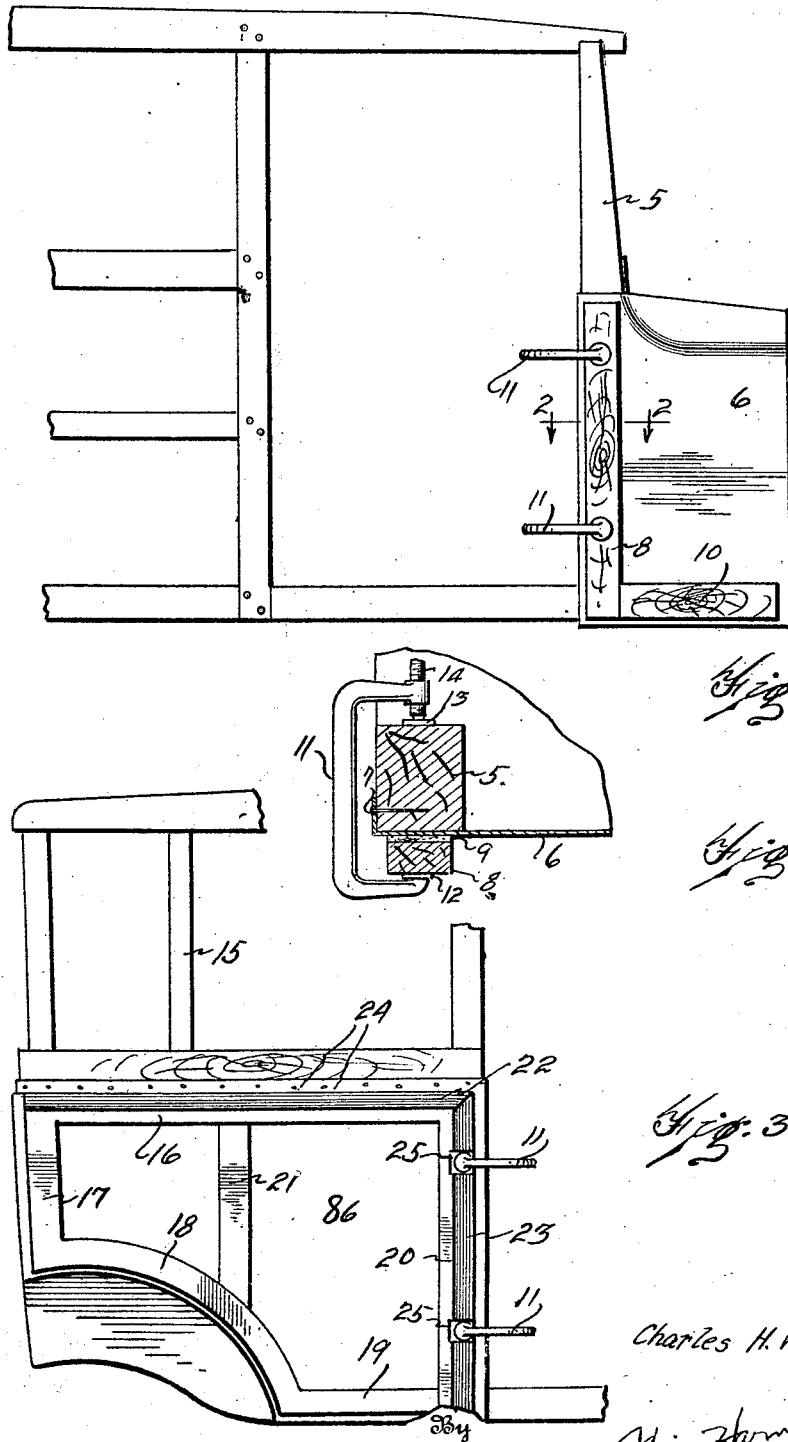

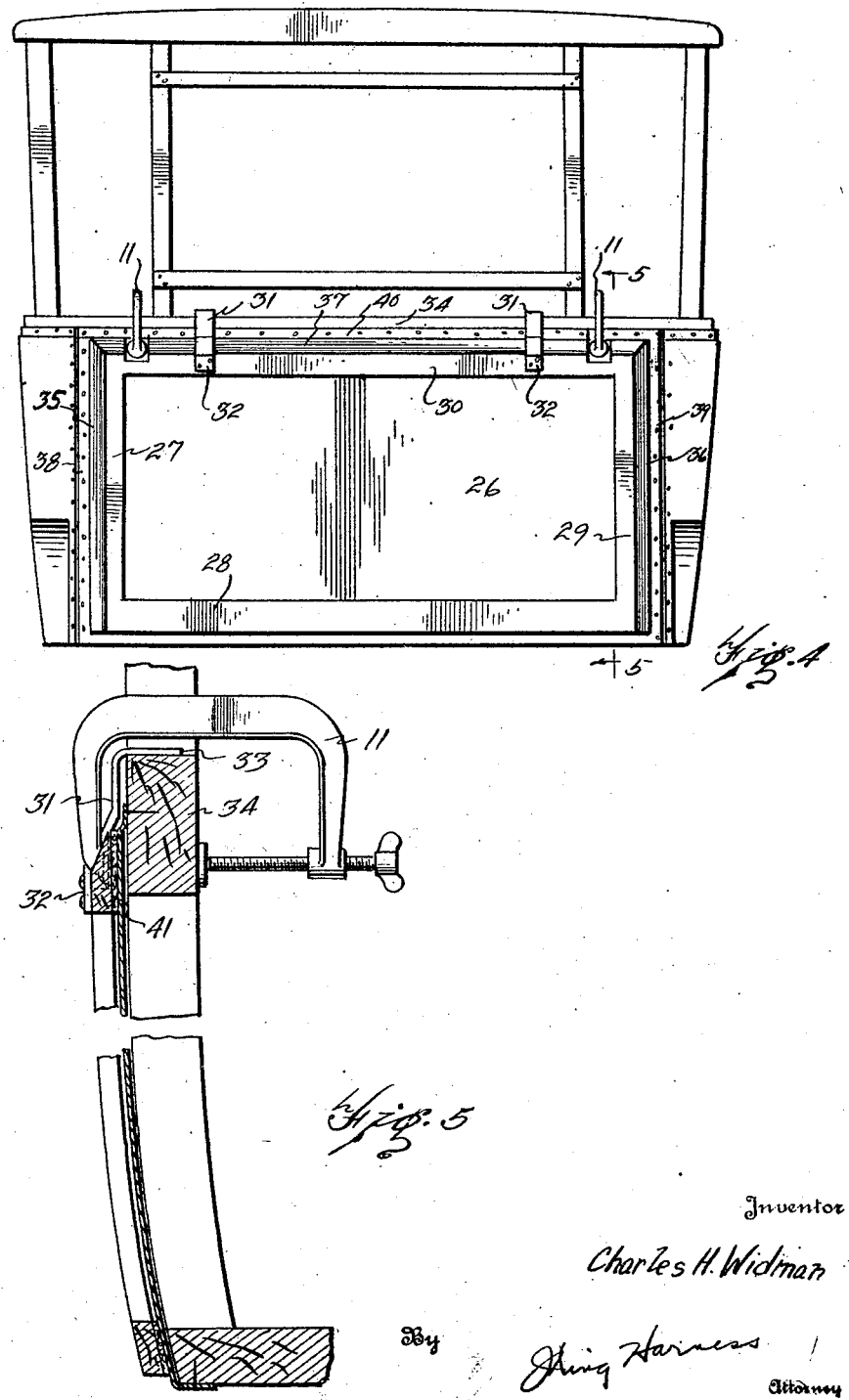

Aug. 4, 1925.
C. H. WIDMAN
1,548,798
AUTOMOBILE BODY MANUFACTURE
Filed Oct. 26, 1923 4 Sheets-Sheet 3
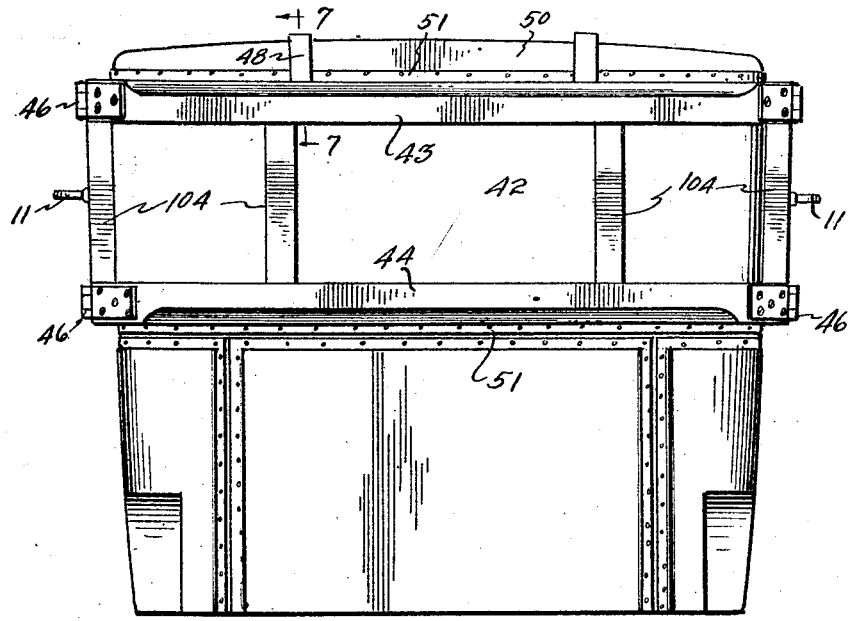
Fig. 6
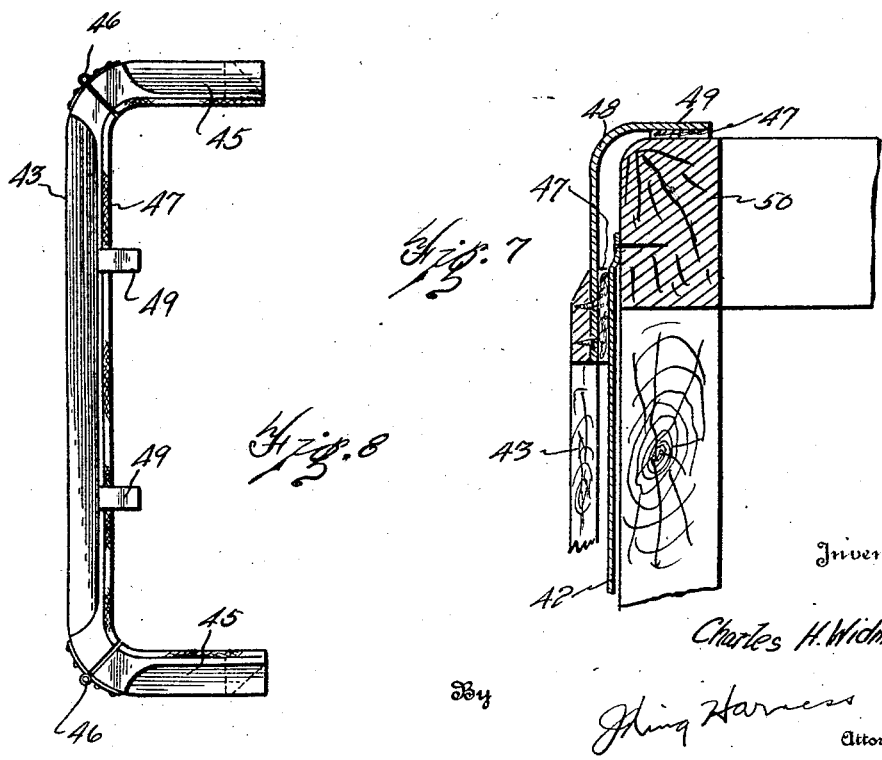
Fig. 7
Fig. 8
Inventor
Charles H. Widman
By
J. King Harness
Attorney Aug. 4, 1925.

C. H. WIDMAN 1,548,798

AUTOMOBILE BODY MANUFACTURE

Filed Oct. 26, 1923  4 Sheets-Sheet 4

Inventor
Charles H. Widman
By  J King Harris
Attorney

Patented Aug. 4, 1925.

1,548,798

UNITED STATES PATENT OFFICE.

CHARLES H. WIDMAN, OF DETROIT, MICHIGAN.

AUTOMOBILE BODY MANUFACTURE.

Application filed October 26, 1923. Serial No. 670,955.

*To all whom it may concern:*

Be it known that I, CHARLES H. WIDMAN, a citizen of the United States, and resident of the city of Detroit, in the county of Wayne and State of Michigan, have invented certain new and useful Improvements in Automobile Body Manufacture, of which the following is a specification.

My invention relates to the type of automobile body wherein the outer casing composed of the cowl and various panels are finished or enameled prior to their assembly upon the body frame.

The primary object of my invention is to provide a series of jigs or fixtures adapted to locate and hold in firm position the cowl and various panels of the body while they are being assembled to the body frame.

In furtherance of this object it is very desirable to provide jigs which are provided with felt or some other suitable soft substance on the under side of the jig where it contacts with the finished portions of the body so as not to mar the same, and to also so construct the jigs that the edges of the cowl and panels may be securely nailed in place without in any way injuring the finished portion thereof, so that unskilled labor may be used in assembly.

With these and other objects in view my invention consists of the arrangement, combination and construction of the various parts of my improved devices as set forth in the specification, claimed in my claims and shown in the accompanying drawings, in which:

Fig. 1 is a side elevation of a portion of the body and a fixture used in assembling the cowl.

Fig. 2 is a sectional view taken on line 2—2 of Fig. 1.

Fig. 3 is a side elevation of a portion of a body and a fixture used in applying the rear lower panel of the body.

Fig. 4 is an elevation of a portion of the body and a jig used in applying the back lower panel of the body.

Fig. 5 is a sectional view taken on line 5—5 of Fig. 4.

Fig. 6 is a rear elevation of a portion of a body showing the jig employed in assembling the back upper panel.

Fig. 7 is a sectional view taken on line 7—7 of Fig. 6.

Fig. 8 is a plan view of the jig shown in Fig. 6.

Figure 9:
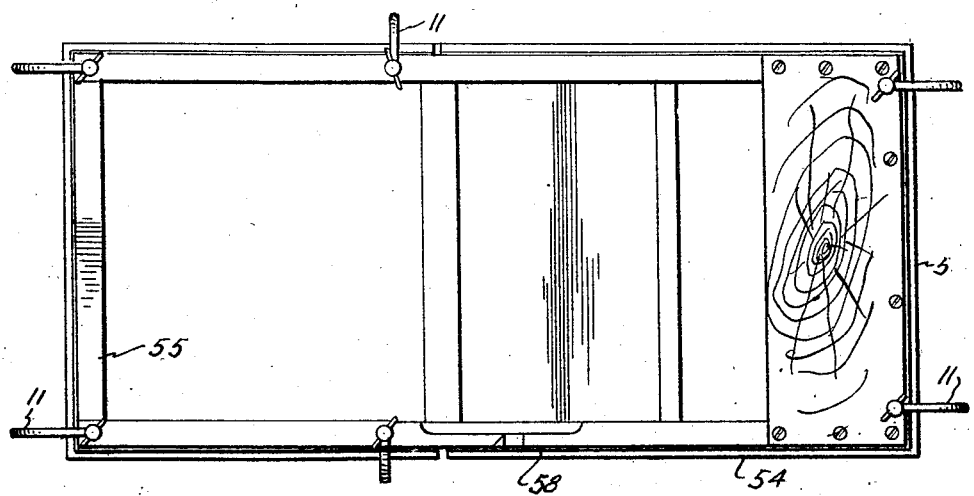
Fig. 9 is a plan view of a jig and door upon which it is used.

In Fig. 1 I have shown a body frame having a standard 5 to which the rear of the cowl 6 is to be secured as at 7. I have provided a jig consisting of a member 8 having a felt lining 9 on its under side adapted to bear against the cowl 6 adjacent its rearward edge. Another member 10 is secured to the member 8 at right angles thereto and extends along the lower portion of the cowl so as to properly locate the fixture. The fixture is secured in place by a plurality of clamps 11 of the well known type wherein the portion 12 thereof bears against the outer face of the member 8, and the portion 13 thereof on the end of the screw 14 is adapted to bear against the inner face of the standard 5 so that by screwing inwardly upon the screw 14 the jig may be securely held in place, and by screwing outwardly the clamp may be released. The clamps hereinafter mentioned are of the same construction.

In Fig. 3 I have shown a body frame 15 upon which a rear side panel 86 is to be secured. I have provided a jig consisting of five sections 16, 17, 18, 19 and 20 with an intermediate brace 21 extending between the portions 16 and 18. The jig is secured in place by clamps 11 identical with those shown in the preceding figures. The portions 16 and 20 of the jig are bevelled at their outer edges 22 and 23 so as to permit nailing of the edges of the panel 86 as at 24 without marring the panel proper. Notches 25 are provided in the section 20 in which one end of the clamps 11 may rest so as to give a firm bearing therefor. The under side of the jig is provided with a felt lining as is shown in Fig. 2.

In Figs. 4 and 5 I have shown the back of an automobile frame to which a back panel 26 is to be assembled. I have provided a jig having four sides 27, 28, 29 and 30 of the same general shape as the panel 26 but slightly smaller than the same so that the edges thereof do not quite extend to the edges of the panel. I provide a plurality of brackets 31 secured to the portion 30 of the jig as at 32 and having the top portion 33 thereof extending over the cross piece 34 of the frame so as to definitely locate the jig with reference to the body and hold it in place until the clamps 11 are secured thereto in the same manner as in Fig. 3. The edges of the portions 27, 29 and 30 are bevelled as at 35, 36 and 37 so as to permit nailing of the edges 38, 39 and 40 of the panel 26 without damaging the main portion thereof. It will be noted that the jig is provided with a felt lining 41 on its under side to prevent damaging the face of the panel 26 of the jig.

In Fig. 6 I have shown a back upper panel 42 adapted to be assembled to the vehicle frame and a jig for use in connection therewith consisting of two separated horizontal members 43 and 44, a plurality of vertical spacers 104 and side horizontal portions 45 adapted to be hinged as at 46 to the members 43 and 44. The said horizontal members adjacent to the hinged connection are rounded in form to conform with the shape of the body. A felt lining 47 is provided on the inner faces of the jig portions to prevent injury to the polished portion of the panel 42. A plurality of brackets 48 are secured to the portion 43 of the jig having top portions 49 adapted to engage over the top 50 of the body so as to definitely locate and hold the jig in place until clamps 11 can be secured thereon. The outer edges of the portions 43, 44 and 45 are bevelled so as to permit nailing of the edges 51 of the panel 42 without damage to the panel.

Figure 10:
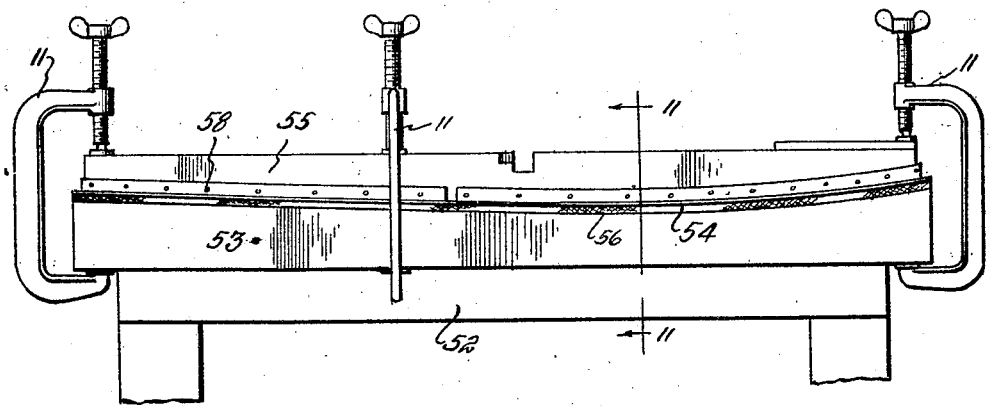
Fig. 10 is a side elevation showing a jig and door.
Figure 11:
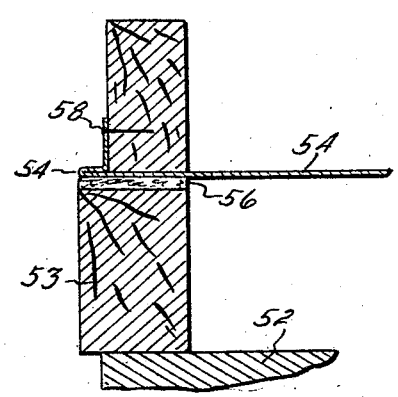
Fig. 11 is a sectional view taken on line 11—11 of Fig. 10.

In Figs. 9, 10 and 11 I have shown a table 52 upon which a jig 53 may rest. The upper face of the jig 53 is shaped to conform with the desired shape of an automobile door consisting of the panel 54 adapted to be secured on the framework 55. The face of the jig 53 is provided with a felt lining 56 in order to prevent marring the polished surface of the door panel. A plurality of clamps 11 is secured around the jig and the door frame so as to definitely press the metal of the panels in position and hold it there while the edges thereof are being nailed as at 57 and 58.

It will thus be seen that I have provided means whereby all the panels and cowl of an automobile body may be assembled to the body frame by unskilled labor without in any way marring the face of the same. While my invention may be desirable for use on bodies which are not pre-enameled or pre-formed, I desire it to be understood that the construction herein shown is of that type and is therefore particularly applicable to that type of body. It will likewise be seen that I have provided means whereby the various parts are definitely located upon the frame so that they will at all times be properly in position for assembling, and so that the metal may not buckle while being assembled.

It is obvious that various changes may be made in the arrangement, combination and construction of the various parts of my improved devices without departing from the spirit of my invention, and it is my intention to cover by my claims such changes as may be reasonably included within the scope thereof.

What I claim is:

1. A jig for assembling automobile body parts consisting of a framework having a non-abrasive face formed to the contour desired for a body part and means for clamping said part and jig to a portion of the body frame to prevent buckling of the part while it is being secured to the frame.

2. A jig for assembling automobile body parts comprising a pair of horizontal spaced members joined by cross pieces, each having members extending from both ends substantially perpendicular thereto and parallel with each other, said members being hinged to said horizontal members to aid in forming a curved joint, all of said members having a non-abrasive face.

3. A jig for assembling automobile body parts comprising a pair of horizontal spaced members joined by cross pieces, each having members extending from both ends substantially perpendicular thereto and parallel with each other, said members being hinged to said horizontal members to aid in forming a curved joint, all of said members having a non-abrasive face, and at least a portion of said members having one upper edge chamfered.

4. A jig for assembling automobile body parts comprising a pair of horizontal spaced members joined by cross pieces, each having members extending from both ends substantially perpendicular thereto and parallel with each other, said members being hinged to said horizontal members to aid in forming a curved joint, all of said members having a non-abrasive face, and at least a portion of said members having one upper edge chamfered, one of said horizontal members having hangers thereon adapted to engage with a portion of the body and locate the jig with reference thereto.

5. A jig for assembling automobile body parts comprising members extended adjacent the exposed edges of the parts, hangers on at least one of said members to aid in holding the same in place, said members having their inner faces lined with felt and their upper edges adjacent said exposed edges chamfered.

Dated, October 22, 1923.

CHARLES H. WIDMAN.